Sept. 6, 1949.  K. H. FOX  2,480,844
DYNAMOELECTRIC MACHINE
Filed June 28, 1946

6 VOLT INPUT

12 VOLT INPUT

INVENTOR
KENNETH H. FOX
BY
Herbert L. Lonsdale Jr.
ATTORNEY

Patented Sept. 6, 1949

2,480,844

UNITED STATES PATENT OFFICE 2,480,844

DYNAMOELECTRIC MACHINE

Kenneth H. Fox, Red Bank, N. J., assignor to Bendix Aviation Corporation, Teterboro, N. J., a corporation of Delaware Application June 28, 1946, Serial No. 679,939

8 Claims. (Cl. 171—123)

The present invention relates to direct current commutator type dynamoelectric machines and particularly to the arrangement of a dynamotor and means for controlling the output thereof.

An object of the invention is to provide an improved dynamoelectric machine with means for maintaining a substantially constant output voltage under varying operating conditions.

Another object of the invention is to provide a dynamotor having inherent stability and novel means for overcoming the delaying effects of hysteresis.

Another object of the invention is to provide a novel multiple input dynamotor having a mechanically balanced and symmetrical commutator arrangement.

Another object of the invention is to provide a dynamotor having a main and booster rotor winding arrangement. The booster rotor winding being a multiple of the main rotor winding and one arranged in relation to the other so as to increase the range of input voltage over which a desired output voltage may be effected. This is specifically accomplished by the windings being so arranged that the voltage induced in the booster is added to the voltage induced in the main winding. Moreover, the difference added by the booster winding is regulated so as to maintain a predetermined output voltage condition under varying input voltages.

Another object of the invention is to provide a novel multiple input dynamotor arrangement, whereby a narrow controlled voltage output range may be effected over a wide range of different voltage input conditions so that a regulator having a relatively narrow operating range may be utilized to control the output.

These and other objects and features of the invention are pointed out in the following description in terms of the embodiment thereof which is shown in the accompanying drawing. It is to be understood, however, that the drawing is for the purpose of illustration only, and is not designed as a definition of the limits of the invention, reference being had to the appended claims for this purpose.

Figure 1:
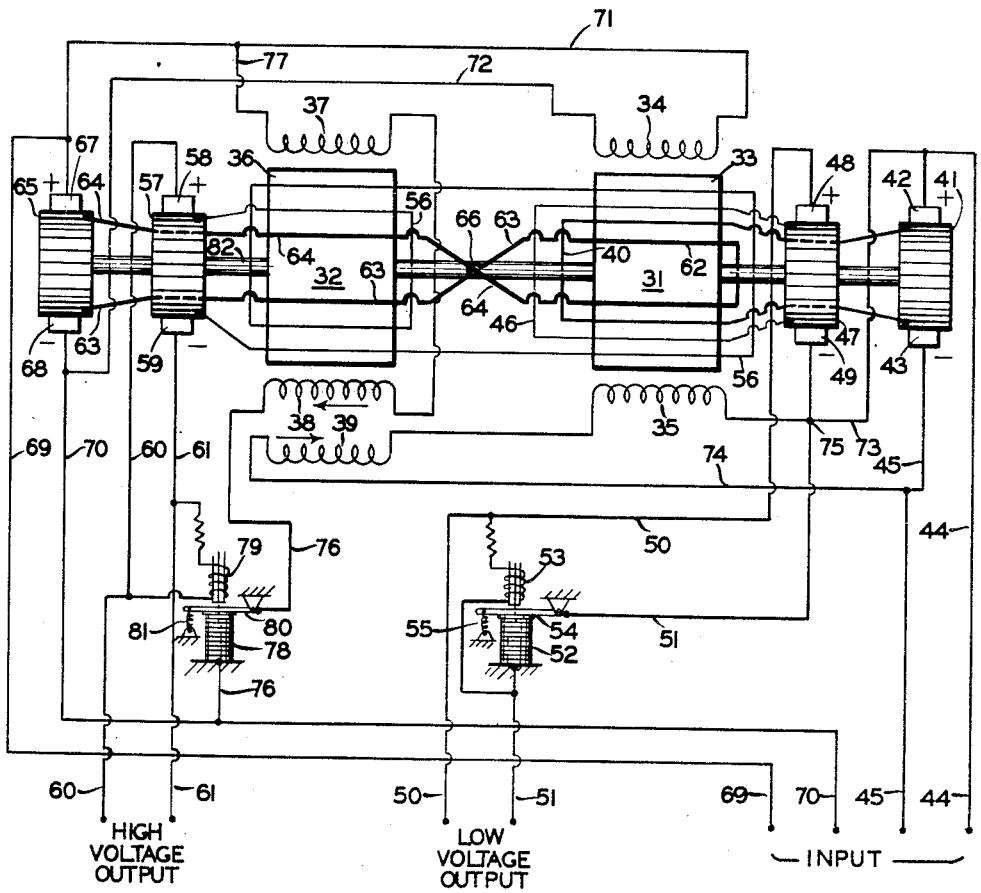
Figure 1 is a schematic view of a form of the invention.

Referring to the drawing of Figure 1, there is illustrated diagrammatically a dynamotor having two magnetic circuits indicated by numerals 31 and 32. The magnetic circuit 31 has a rotor 33 and stator or field windings 34 and 35, while the magnetic circuit 32 includes a rotor 36 and stator or field windings 37, 38 and 39.

The rotor 33 has a first winding 40 connected to suitable segments of a commutator 41 having cooperating brushes 42 and 43. Input lines 44 and 45 lead to the respective brushes 42 and 43 as will be explained.

The rotor 33 has a second winding 46 connected to suitable segments of a commutator 47 having cooperating brushes 48 and 49. Output lines 50 and 51 lead from the brushes 48 and 49, respectively. There is provided in the output line 51 a variable resistance indicated schematically by the numeral 52 and of the carbon pile type having a control winding 53. The latter winding 53 is connected across the output lines 50 and 51 and is arranged to affect an armature 54 biased under tension of a spring 55 in opposition to the biasing force of the electromagnetic control winding 53. Upon a rise in the voltage across the output lines 50 and 51 the control winding 53 causes the armature 54 to increase the resistance of the carbon pile 52, while upon a decrease in the voltage, the resistance is decreased. The spring 55 is arranged so as to balance the pull on the armature 54 by the electromagnet 53 when the electromagnet 53 is energized by a voltage having a predetermined regulated value. The regulator may be of a type such as shown in the copending application Serial No. 612,691 of William G. Neild filed August 25, 1945. Thus the control winding 53 varies the resistance of the carbon pile 52 so as to maintain a predetermined regulated output voltage across the lines 50 and 51.

An output winding 56 is wound in both magnetic circuits 31 and 32 on rotor 33 and 36. The winding 56 on rotor 36 is a multiple of the turns on rotor 33. The high voltage output winding 56 is connected to suitable segments of a commutator 57 having cooperating brushes 58 and 59. High voltage output lines 60 and 61 lead from the brushes 58 and 59.

The winding 56 on rotor 36 has a sufficiently large number of turns and is arranged so as to add to the output voltage obtained from the winding 56 on rotor 33 to provide the desired regulated output voltage, as will be explained.

A further winding 62 is wound on rotor 33 and has lead lines 63 and 64 which pass through rotor 36 and commutator 57 to suitable segments on a commutator 65. The field winding 34 has the same polarity as field winding 37, while field winding 35 has the same polarity as field winding 38. In order to counteract dynamotor action in rotor 36 by the leads 63 and 64 passing through the same, it is necessary to reverse or cross the leads before they pass through the rotor 36 as indicated at 66.

Due to this arrangement, there is generated a voltage in the leads 63 and 64 in rotor 36 with a polarity in such a direction as to decrease the back E. M. F. of motor winding 62 which will increase the speed of the rotors 33 and 36. This increase in speed will be greatest at maximum flux which is also the point at which the output would normally be lowest and thus the increase in speed will add to the output ability of the unit.

If the leads be not reversed, the speed will decrease at the point of maximum flux decreasing the effectiveness of the unit. The point of maximum flux is the point of normal lowest output.

If instead of reversing the leads 63 and 64 as indicated, the poles of windings 37 and 38 were reversed transverse flux would flow between the magnetic circuits 31 and 32 and the output winding 56 would have to be reversed instead of the leads 63 and 64.

Thus in order to simplify the structure, the leads 63 and 64 may be reversed as indicated, in order to avoid undesired dynamotor action in rotor 36.

Cooperating with the segments of the commutator 65 are brushes 67 and 68 from which lead the input conductors 69 and 70, respectively. The field winding 34 of the magnetic circuit 31 is connected across the brushes 67 and 68 by conductors 71 and 72, respectively, while the field winding 35 and the compensating winding 39 connected in series therewith, is connected across brushes 42 and 43 by conductors 73 and 74. The conductor 73 is connected to conductor 51 at 75 for a purpose which will be explained.

The field windings 37 and 38 of the magnetic circuit 32 are connected in series across input conductors 70 and 71 by conductors 76 and 77, respectively. A variable resistance element 78 is connected in the line 76 so as to regulate the excitation of the field windings 37 and 38. The regulator 78 as shown in the drawing may be of the carbon pile type having a control winding 79.

The latter winding 79 is connected across the output lines 60 and 61 and is arranged so as to effect an armature 80 biased under tension of a spring 81 in opposition to the biasing force of the electromagnetic control winding 79. Upon a rise in the voltage across the output lines 60 and 61 the control winding 79 causes armature 80 to increase the resistance of the carbon pile 78, while upon a decrease in the voltage the resistance is decreased.

The spring 81 is arranged so as to balance the pull on the armature 80 by the electromagnet 79 when the electromagnet 79 is energized by a voltage having a predetermined regulated value. The regulator may be of a type such as shown in the copending application Serial No. 612,691 by William G. Neild filed August 25, 1945. Thus the control winding 79 varies the resistance of the carbon pile 78 and the excitation of the field windings 37 and 38 so as to maintain a predetermined regulated output voltage across the lines 60 and 61 by varying the additive voltage obtained from the winding 56 on rotor 36.

The polarity of the winding 39 is opposed to that of the windings 37 and 38 and is so arranged in relationship to the windings 37 and 38 as to cause a subtraction of the booster voltage from the normal output for an increase of ampere turns caused by an increase in input voltage. The winding 39 is thus so polarized as to overcome the delaying effects of hysteresis and is quickly responsive to change in input voltage.

Moreover, the winding 56 on rotor 36 compensates for changes in input voltage, through operation of the regulator 78 so that the resultant output is maintained substantially constant upon changes in input voltage.

Thus the regulator 78 varies the additional voltage provided by the generator action of the magnetic circuit 32 so as to maintain the output voltage across lines 60 and 61 substantially constant.

The commutators 41, 47, 57 and 65 and rotors 33 and 36 are suitably mounted on a drive shaft 82. The drive shaft 82 is driven by the rotor 33 which cooperates in the magnetic circuit 31 as a motor for driving the shaft 82 and connected parts.

Figure 2:
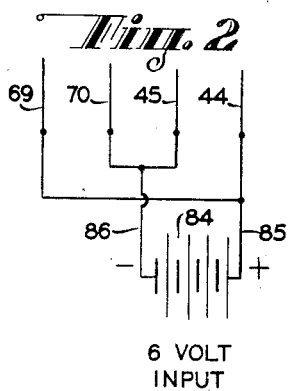
Figure 2 illustrates input connections for the device of Figure 1 under low input voltage conditions.

As indicated in Figure 2, the device may be connected for low input voltage operation, of for example 6 volts, from a source 84. In the latter case, conductors 85 and 86 are arranged so as to connect conductors 44 and 69 and conductors 45 and 70, respectively, and the motor windings 40 and 62 in parallel to the input source of electrical energy 84.

Figure 3:
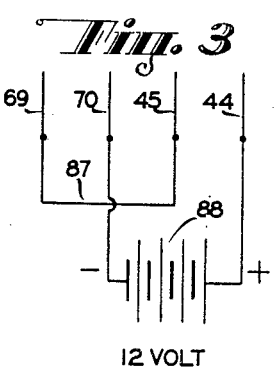
Figure 3 illustrates input connections for the device of Figure 1 under medium input voltage conditions.

For medium input voltage operation of for example, 12 volts, as shown in Figure 3, the conductors 45 and 69 may be connected in series by conductor 87 and the input voltage applied across conductors 44 and 70. In the latter case the motor windings 40 and 62 are connected in series from the positive terminal of an input source of electrical energy 88 through conductor 44, brush 42, motor winding 40, brush 43, conductor 45, conductor 87, conductor 69, brush 67, motor winding 62, brush 68, and conductor 70 to the negative terminal of the source of electrical energy 88.

In low and medium input voltage operation, it will be seen that the winding 46 serves as a low voltage output generator in which the output voltage is regulated by the carbon pile regulator 52 so as to maintain a predetermined constant output voltage across the low voltage output lines 50 and 51.

Figure 4:
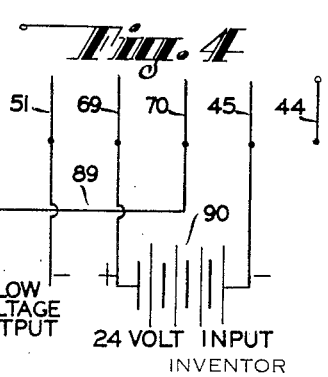
Figure 4 illustrates input connections for the device of Figure 1 under relatively high input voltage conditions.

For high input voltage operation of, for example, 24 volts, the conductors 50 and 70 may be connected by conductor 89 and a source of input voltage 90 applied across conductors 69 and 45, as shown in Figure 4.

In the latter case, the windings 40, 46 and 62 are connected in series as motor windings from the positive terminal of the input source of electrical energy 90 through conductor 69, brush 67, winding 62, brush 68, conductor 70, conductor 89, conductor 50, brush 48, winding 46, brush 49, conductor 51 to connection 75, conductor 73, brush 42, winding 40, brush 43 and conductor 45 to the negative terminal of the source of electrical energy 90.

In the latter arrangement the low voltage output is obtained from the voltage drop across the winding 46, and the carbon pile regulator 52 serves to maintain this low voltage output substantially constant across the lines 50 and 51.

It will be seen, moreover, that during low, medium, and high voltage input operation, the winding 56 on rotors 33 and 36 serve as a high voltage generator and the high output voltage is maintained substantially constant by the regulator 75 which under different load and input voltage conditions tends to vary the excitation of the field windings 37 and 38 and thereby the output voltages.

The compensating winding 39 tends to compensate for changes in input voltage, and varies in response thereto, the voltage added by the generator action of the magnetic circuit 32, while the regulator 78 varies the excitation of the field windings 37 and 38 so as to maintain this output voltage substantially constant for different load and input voltage conditions.

For purposes of clarity the dynamotor circuits for the device of Figure 1 have been illustrated as applied to one set of rotor windings in one position of the commutator. However, in practice, a plurality of such sets of D. C. rotor windings may be provided, as is well known in the art.

Although only one embodiment of the invention has been illustrated and described, various changes in the form and relative arrangement of the parts, which will now appear to those skilled in the art, may be made without departing from the scope of the invention. Reference is, therefore, to be had to the appended claims for a definition of the limits of the invention.

What is claimed is:

1. A dynamo-electric machine comprising in combination a stationary member and a rotatable member, said rotatable member being divided into a pair of magnetically substantially separate sections, a generator winding in both sections of said rotatable member, a first motor winding in one of said sections, a first commutator connected to said generator winding, a second commutator connected to the motor winding, said first and second commutators mounted at opposite ends of said rotatable member, a first field winding on said stationary member and cooperating with said one section of the rotatable member, a second field winding on said stationary member and cooperating with the second section of said rotatable member, a source of electrical energy for exciting said first field winding, input brushes cooperating with the second commutator for connecting said motor winding to said source of electrical energy, output brushes cooperating with said first commutator, means connecting said second field winding to said source of electrical energy, said connecting means including a regulator for said second field winding responsive to the voltage across said output brushes, the portion of said generator winding in said second section arranged in relation to the portion of said generator winding in the one section so as to supply an accumulative voltage to said output brushes, a compensating winding connected to said source of electrical energy and having an opposite polarity to that of said second field winding so as to differentially affect the magnetic flux of said second field winding in accordance with changes in the voltage of said source, a second motor winding in said one section, a third commutator mounted on said rotatable member and adjacent said first commutator, means connecting said second motor winding to said third commutator, input brushes cooperating with the third commutator for connecting said motor winding to said source of electrical energy, said connecting means extending from said third commutator through said second section to said second motor winding in such a manner that a voltage may be generated in said conductors of such a polarity as to augment the voltage applied to the second motor winding from said source.

2. A dynamo-electric machine comprising in combination a stationary member and a rotatable member, said rotatable member being divided into a pair of magnetically substantially separate sections, a generator winding in both sections of said rotatable member, a first motor winding in one of said sections, a first commutator connected to said generator winding, a second commutator connected to the motor winding, said first and second commutators mounted at opposite ends of said rotatable member, a first field winding on said stationary member and cooperating with said one section of the rotatable member, a second field winding on said stationary member and cooperating with the second section of said rotatable member, a source of electrical energy for exciting said first field winding, input brushes cooperating with the second commutator for connecting said motor winding to said source of electrical energy, output brushes cooperating with said first commutator, means connecting said second field winding to said source of electrical energy, said connecting means including a regulator for said second field winding responsive to the voltage across said output brushes, the portion of said generator winding in said second section arranged in relation to the portion of said generator winding in the one section so as to supply an accumulative voltage to said output brushes, a compensating winding connected to said source of electrical energy and having an opposite polarity to that of said second field winding so as to differentially affect the magnetic flux of said second field winding in accordance with changes in the voltage of said source, a second motor winding in said one section, a third commutator mounted on said rotatable member and adjacent said first commutator, means connecting said second motor winding to said third commutator, input brushes cooperating with the third commutator for connecting said motor winding to said source of electrical energy, said connecting means extending from said third commutator through said second section to said second motor winding in such a manner that a voltage may be generated in said conductors of such a polarity as to augent the voltage applied to the second motor winding from said source, an additional winding in said one section, a fourth commutator mounted on said rotatable member and adjacent said second commutator, means connecting said additional winding to said fourth commutator, brushes cooperating with the fourth commutator, and connecting means for said last mentioned brushes adapted to connect said additional winding alternately as a motor or as a generator winding.

3. A dynamotor, comprising, in combination, a plurality of motor windings and generator windings, means for selectively connecting said motor windings alternatively to a source of electrical energy in shunt or series relation, and means for selectively connecting at least one of said generator windings as a motor winding in series with said series connected motor windings to adapt said dynamotor for operation under widely different input voltage conditions of said source.

4. A dynamotor, comprising, in combination, a plurality of motor windings and generator windings, a source of electrical energy for energizing said motor windings, an output circuit for one of said generator windings, a booster winding connected in series with said one generator winding and arranged to accumulatively supply said output circuit, said booster winding being of such a value as to provide a relatively wide range of booster voltages, means for regulating said booster winding over said wide range in response to the output voltage so as to maintain a substantially constant output voltage under widely different input voltage conditions of said source, means for selectively connecting said motor windings to said source in shunt or series relation and for selectively connecting at least one of said generator windings as a motor winding in series with said series connected motor windings to adapt said dynamotor for operation under said different input voltage conditions of said source.

5. For use with widely different input voltage sources, a dynamo electric machine of a type including a pair of motor windings and a pair of generator windings; the improvement comprising selective electrical connector means for said windings to alternatively connect said motor windings in parallel relation to a source of electrical energy having a relatively low voltage output or in series relation to a source of electrical energy having a relatively greater voltage output, said selective electrical connector means further effective to alternatively connect one of said generator windings in series relation with said series connected motor windings and to a source of electrical energy having a relatively still greater voltage output for effective operation under such different voltage conditions.

6. The combination defined by claim 5 in which the other of said pair of generator windings includes a booster winding and a main generator winding, means for regulating said booster winding in response to the accumulative output of said main and booster windings, said booster winding having a greater number of turns than said main winding and connected in series with said main winding to amplify the effect of said regulating means upon the accumulative output voltage of said main and booster windings so that a predetermined output voltage may be maintained by said regulating means under a relatively wide range of different input voltage conditions.

7. The combination defined by claim 5 including field windings for said motor and generator windings, said field windings connected in parallel relation to said motor windings, said field windings including a compensating winding connected in series relation with one of said field windings and differentially affecting another of said field windings to compensate for different input voltage conditions, means for regulating said other field winding in response to the voltage output of the other of said pair of generator windings, said other generator winding including a booster winding affected by said other field winding and a main generator winding affected by said one field winding, said booster winding having a greater number of turns than said main winding and connected in series with said main winding to amplify the effect of said regulating means upon the accumulative output voltage of said main and booster windings so that a predetermined output voltage may be maintained by said regulating means under a relatively wide range of different input voltage conditions.

8. In a dynamo electric machine of a type including a direct current motor, a main generator having an armature driven by said motor and rotatable in a magnetic field, a booster generator having an armature driven by said motor and rotatable in another magnetic field, a source of electrical energy for energizing said motor and fields of the main and booster generators, an output circuit accumulatively supplied by said main and booster generators, a compensating winding for said booster generator energized from said source of electrical energy to differentially affect the field of said booster generator so as to decrease the generated current of said booster upon increase in the voltage of said source, means for regulating the energization of the field of said booster generator and thereby the accumulative output voltage of said main and booster generators, and the booster and main generators having armature windings; the improvement comprising the armature winding portion of the booster generator including a plurality of turns and a greater number of turns than the turns of the armature winding portion of the main generator, said portion of the armature winding of the booster generator being directly connected in series with the portion of the armature winding of the main generator in the output circuit so as to supply an accumulative voltage to said output circuit and to amplify the effect of said regulating means upon the output voltage so that a predetermined output voltage may be maintained by said regulating means under a relatively wide range of different voltage conditions of said source of electrical energy.

KENNETH H. FOX.

REFERENCES CITED

The following references are of record in the file of this patent:

UNITED STATES PATENTS

| Number | Name | Date |
|---|---|---|
| 660,908 | Lamme | Oct. 30, 1900 |
| 1,096,923 | Kramer | May 19, 1914 |
| 1,921,719 | Allen | Aug. 8, 1933 |
| 2,427,919 | Mironowicz | Sept. 23, 1947 |

Certificate of Correction

Patent No. 2,480,844.  September 6, 1949.

KENNETH H. FOX

It is hereby certified that error appears in the printed specification of the above numbered patent requiring correction as follows:

Column 6, line 54, claim 2, for "augent" read *augment*;

and that the said Letters Patent should be read with this correction therein that the same may conform to the record of the case in the Patent Office.

Signed and sealed this 25th day of October, A. D. 1949.

[SEAL]

THOMAS F. MURPHY,
*Assistant Commissioner of Patents.*